(12) United States Patent
Washio

(10) Patent No.: US 6,466,340 B1
(45) Date of Patent: Oct. 15, 2002

(54) IMAGE READING APPARATUS

(75) Inventor: Koji Washio, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/257,702

(22) Filed: Feb. 25, 1999

(30) Foreign Application Priority Data

Mar. 2, 1998 (JP) .......................................... 10-049285

(51) Int. Cl.$^7$ ............................................... H04N 1/04
(52) U.S. Cl. ...................................... 358/488; 382/289
(58) Field of Search ................................ 358/488, 474, 358/452, 453, 448, 494, 497; 382/289, 296

(56) References Cited

U.S. PATENT DOCUMENTS

| | | | | |
|---|---|---|---|---|
| 4,878,124 A | * | 10/1989 | Tsujimoto et al. | 358/443 |
| 5,719,968 A | * | 2/1998 | Hashimoto et al. | 358/488 |
| 5,854,964 A | * | 12/1998 | Atsumi | 358/488 |
| 5,940,128 A | * | 8/1999 | Morimura | 382/298 |

FOREIGN PATENT DOCUMENTS

| | | |
|---|---|---|
| JP | 2-25863 | 1/1990 |
| JP | 7-262312 | 10/1995 |
| JP | 10-285379 | 10/1998 |
| JP | 10-336425 | 12/1998 |

* cited by examiner

Primary Examiner—Cheukfan Lee
(74) Attorney, Agent, or Firm—Frishauf, Holtz, Goodman & Chick, P.C.

(57) ABSTRACT

An image reading apparatus includes: an image reading device for reading an image in a reading area including an inside and an outside of an original document area to obtain image data; a memory for storing the image data obtained by the image reading device; an edge detector for detecting a plurality of edges in the original document area according to the image data obtained by the image reading device; a calculator for calculating an inclination of an original document on the basis of the plurality of edges detected by the edge detector; and a correcting device for correcting the inclination of the original document on the basis of the inclination calculated by the calculator with respect to at least the image data in the original document area among the image data stored in the memory.

3 Claims, 7 Drawing Sheets

IMAGE READING APPARATUS

BACKGROUND OF THE INVENTION

The present invention relates to an image reading apparatus comprising an image reading means which reads an image in a reading area including an original document area to obtain image data, and a memory means which stores the image data obtained by the aforesaid image reading means, and specifically to an image reading apparatus which may correct inclination of the original document, if any.

The image reading apparatus which reads the image in the reading area including an original document area and comprises an image reading means which obtains image data and a memory means which stores the image data obtained by the aforesaid image reading means is employed in scanners, facsimile machines, digital copiers, and the like. Generally speaking, such an image reading apparatus is constituted in such a manner that an original document is placed on the document platen and the image information of the original document on the document platen is read. At the time, the image reading apparatus reads image data in the larger area (hereinafter referred to as reading area) than the placed original document area (hereinafter referred to as original document area).

In such an image reading apparatus, when an original document is placed with inclination, of read image data, the image data in the original document area includes inclination data. When an image or the like is formed employing the resulting image data, the formed image may be discontinuous, and no exact image formation may be carried out. On account of this, heretofore, an image reading apparatus has been proposed, in which for image data of inclined original document area, inclination correction (correcting inclination) is carried out. In the case of correcting the inclination, it is required to detect the inclination of the original document. Regarding the detection of the inclination of the original document, there have been various types of proposals.

For example, Japanese Patent Publication Open to Public Inspection No. 2-25863 proposes an image reading apparatus in which prior to reading image data, inclination of the original document is detected by pre-scanning, employing a sensor which detects any inclination of the original document. Further, Japanese Patent Publication Open to Public Inspection No. 7-262312 proposes an image reading apparatus in which any inclination of the original document is detected on the basis of the arrangement of text characters obtained from the read image data.

In the image reading apparatus proposed by the aforesaid Japanese Patent Publication Open to Public Inspection No. 2-25863, an exclusive sensor to detect the inclination is required, at an increase of cost. Furthermore, pre-scanning, as an additional mechanical motion, is carried at an increase of time. Furthermore, in the image reading apparatus proposed in Japanese Patent Publication Open to Public Inspection No. 7-262312, problems are caused in which in order to check the arrangement of characters, complicated image processing and image recognition techniques are required, and due to this, excessive processing time is required, and when characters on an original document are intentionally declined, defective operation is caused.

Accordingly, an object of the present invention is to provide an image reading apparatus which readily detects any inclination without the installment of an exclusive sensor, additional mechanical motion and complicated image recognition processing.

The aforesaid object can be accomplished by the structure below.

In an image reading apparatus comprising an image reading means which reads an image in a reading area including an original document area, to obtain image data and a memory means which stores the image data obtained by the aforesaid image reading means, an image reading apparatus characterized in comprising an edge detecting means which detects a plurality of edges in the aforesaid original document area, on the basis of the image data obtained by the aforesaid image reading means, a calculation means which calculates the degree of inclination of an original document on the basis of a plurality of edges detected by the aforesaid edge detecting means, and an inclination correcting means which corrects for the inclination based on the inclination of the original document calculated by the aforesaid calculation means, for at least the image data in the aforesaid original document area among the image data stored by the aforesaid memory means.

DETAILED DESCRIPTION OF THE PREFERRED EMBODIMENT

Figure 1A:
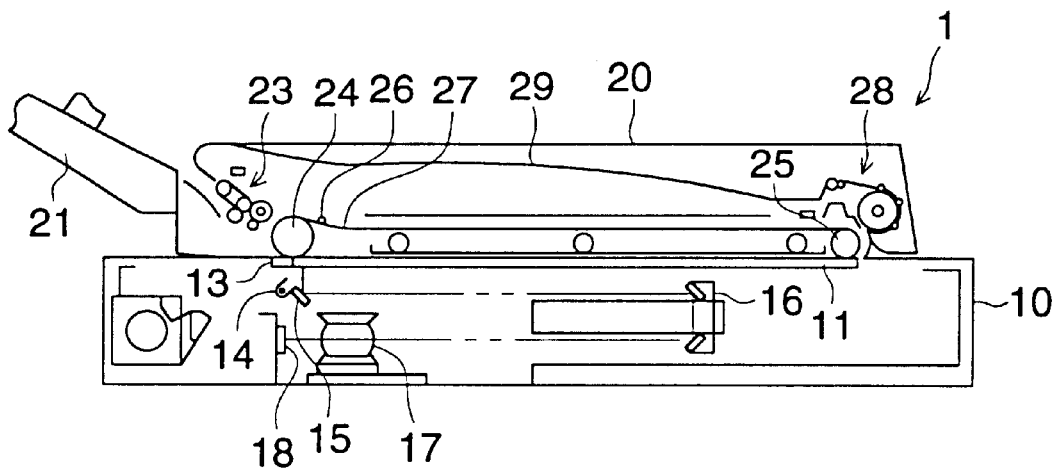
FIG. 1(a) is a schematic constitution view of an image reading apparatus and FIG. 1(b) is its front perspective view.
Figure 1B:
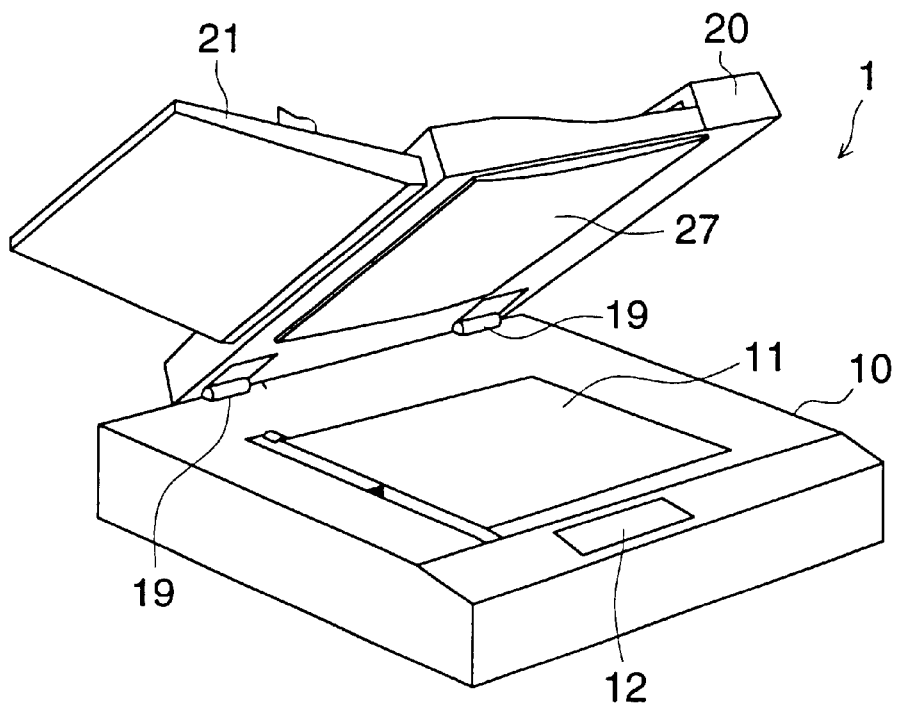

One embodiment of the present invention is explained with reference to attached drawings. FIGS. 1(a) and 1(b) are a schematic constitution view of an image reading apparatus and its front perspective view, respectively. Further, in the image reading apparatus 1 of the present embodiment, an image reading apparatus body 10 is provided with an automatic original document conveyance device 20, and an image of any of an original document which is conveyed employing the aforesaid automatic original document conveyance device 20 or of an original document which is directly placed on the document platen can be read.

Described first, is an outline for reading an original document conveyed by the automatic original document conveyance device 20.

The operator places an original document to be read on an document platen 21. The operator then indicates the beginning of reading by depressing a reading start button (not shown) on an operation panel 12 (composed of a touch panel, etc.) functioning as a display means and an input means, which is provided on the front surface of the image reading apparatus body 10.

Upon receiving the reading initiation indication, the conveying means conveys an original document placed on the document platen 11 to the document platen 11. Namely, the original documents placed on the document platen 11 are transported employing a group of conveyance rollers 23 upon being separated to individual sheet which is conveyed to the reading position on the document platen 11, while being placed between a conveyance belt 27 and the document platen 11, employing the conveyance belt 27, which is trained about a driven roller 24, a drive roller 25 and a tension roller 26, and is placed on the document platen 11.

When an original document is placed onto the document platen 11, light is irradiated onto the original document employing a light source 14, which is a linear light source extending in the primary scanning direction (in the direction perpendicular to the page in FIG. 1(a)). Light reflected from the original document is focused onto an image sensor 18 as an imaging means by a lens 17 as an image focusing means via a first mirror 15 and a V mirror 16. The image sensor 18 is a means to read the image of an original document and a photoelectric transfer element which performs photoelectric transfer for light reflected from the original document at each pixel, and is constituted with a line sensor (line CCD) extending in the primary scanning direction and reads the image of the original document in single unit in the primary scanning direction.

Furthermore, it is constituted in such a manner that the light source 14 and the first mirror 15 are integrated and move in the secondary scanning direction (the right direction in FIG. 1(a)), while the V mirror 16 moves at one half the speed of the light source 14 and the first mirror 15. Accordingly, by moving the light source 14, the first mirror 15, and the V mirror 16 in the secondary scanning direction against the original document on the document platen 11, the entire area of an original document can be scanned. By successively reading light reflected from this original document employing the image sensor 18, the image on one sheet of the original document can be read.

The original document, of which the entire image is read, is conveyed by the conveyance belt 27 and ejected into an ejecting paper tray 29, employing paper-ejecting rollers 28.

This image reading apparatus 1, as described above, is constituted in such a manner that an original document conveyed by the automatic original document conveyance device is read and moreover, the original document, placed directly on the document platen 11 can be read. Namely, the automatic original document conveyance apparatus 20 is provided in the image reading apparatus body 10, employing a hinge 19 and is further structured so as to enable it to open and close (enable it to fall down) for the image reading apparatus body 10.

Accordingly, when an original document is placed directly on the document platen 11 and is read, the operator opens the automatic original document conveyance device 20 (refer to FIG. 1(b)); places an original document to be read on the document platen 11, and returns to the state in FIG. 1(a) by closing the automatic original document conveyance device 20. Then, the operator indicates the beginning of reading by depressing the read start button. Thereafter, in the same manner as described above, the image of the original document, placed on the document platen 11, is read. However, in this case, even though the start button is depressed, the automatic original document conveyance device is not driven being different from the case described above.

As described above, the image reading apparatus 1 of the present embodiment comprises, as the image reading means, an document platen 11 on which an original document is placed, a conveyance belt 27 which works as an document platen cover covering the document platen 11 via the original document placed on the document platen 11, a scanning means (composed of the light source 14, first mirror 15, V mirror 16, etc.) which scans the surface of the document platen 11 along with the lower surface of the document platen, and the image sensor 18 which performs photoelectric conversion for reflected light from the document platen 11 upon being scanned by the scanning means, and reads the image on the document platen 11 employing the aforesaid image reading means. After shading correction and A/D conversion are carried out, image data can be obtained, which are stored in an image memory 31 (refer to FIG. 2).

Further, regarding the image data which are read by the aforesaid image reading means, in order to make it possible to correspond to various sizes of original documents, read can be the image data in a larger area (hereinafter referred to as reading area) than the area of an original document (hereinafter referred to as original document area) which is placed on the document platen 11.

In the image reading apparatus 1 as described above, when an original document is placed at an inclination, read image data are that image data of the original document area are in an inclined state. When image formation, etc. are carried out employing the aforesaid image data, the resulting image becomes not continuous and no correct image formation can be carried out.

Figure 2:
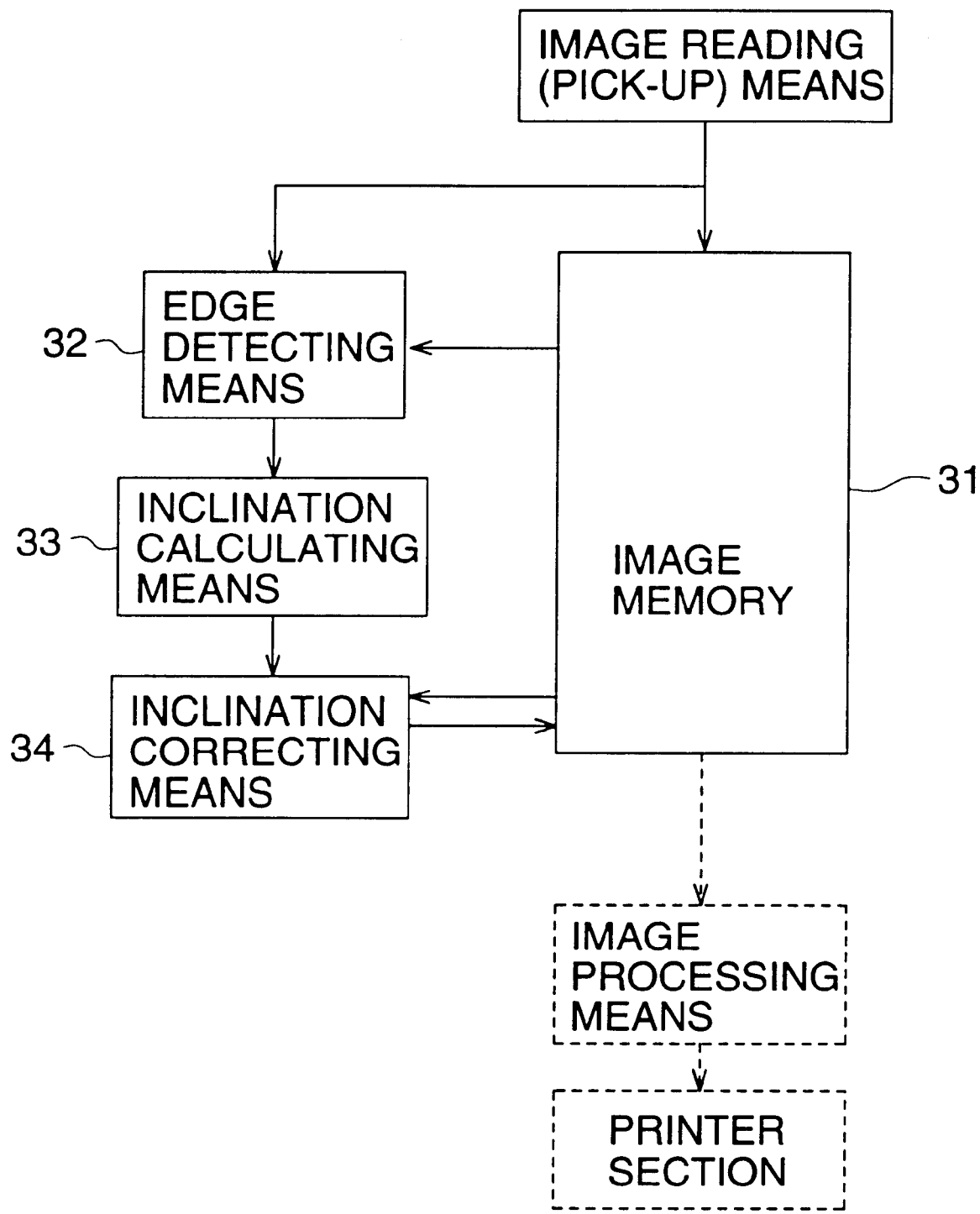
FIG. 2 is a schematic image data flow chart as an outline for correction of inclination.

Accordingly, the present embodiment is constituted in such a manner that inclination correction (correcting inclination) is carried out for the image data in an inclined original document area. FIG. 2 illustrates a schematic image data flow on the outline of inclination correction of the present embodiment. Further, FIG. 2 shows a case in which the image reading apparatus 1 is employed as the scanner of a copier. When image formation is carried out, the image data stored in the image memory 31 are subjected to image processing such as space frequency filtering, $\gamma$ conversion, error diffusion processing, image inspection/correction processing, etc., employing an image processing means (no numeral reference given). Based on the image data subjected to the aforesaid image processing, image formation is carried out in a printer section (also no numeral reference given).

In the present embodiment, in order to correct for inclination, provided are an edge detection means 32, a calculation means 33, and an inclination correction means 34. The edge detection means is a means which detects a plurality of edges in the original document area from the resulting image data, based on image data obtained by the image reading means. The calculation means is a means which calculates original document inclination, based on a plurality of edges detected by the edge detection means 32. The inclination correction means is a means which corrects inclination based on the inclination calculated by the calculation means 33 for at least the image data in the original document area stored in the image memory 31. These edge detection means 32, calculation means 33, and inclination correction means 34 may be constituted as software or as a hard circuit.

With the image reading apparatus 1 of the present embodiment as constituted above, an outline of inclination correction is described.

First, the image in a reading area including an original document area is read by an image reading means to obtain image data, which are stored in the image memory 31. Based on the image data (the image data obtained by the image reading means may be directly used, or the image data which are temporarily stored in the image memory 31 may be used) obtained by the aforesaid image reading means, a plurality of edges in the image area from the image data are detected. Based on a plurality of edges detected by the edge detection means 32, the calculation means 33 then calculates the inclination of the original document. Thereafter, based on the original document inclination calculated by the calculation means, the inclination correction means 34 performs inclination correction processing for at least the image data in the original document area from the image data stored in the image memory 31.

As described above, in the present embodiment, an existing image reading means is employed; edges are detected on the basis of image data read by the aforesaid image reading means, and the inclination is calculated (detected). Therefore, there is no need of a special sensor to detect the inclination to result in minimized increase in cost. Furthermore, on the basis of the image data (image data which are later subjected to inclination correction) read by the reading means, edges are detected and the inclination is calculated (detected). Accordingly, additional mechanical motion such as pre-scanning is carried out and no waste of time is caused. Furthermore, edges in the original document area are detected and original document inclination is calculated. Thus, as compared to detecting the original document inclination by detecting the arrangement of characters, simple image processing and image recognition are available to enable to shorten the processing time. Furthermore, on the basis of edges in the original document area, the original document inclination is detected and corrected. Therefore, even though the operator intentionally inclines characters written on the original document, no defective operation is caused.

Figure 3:
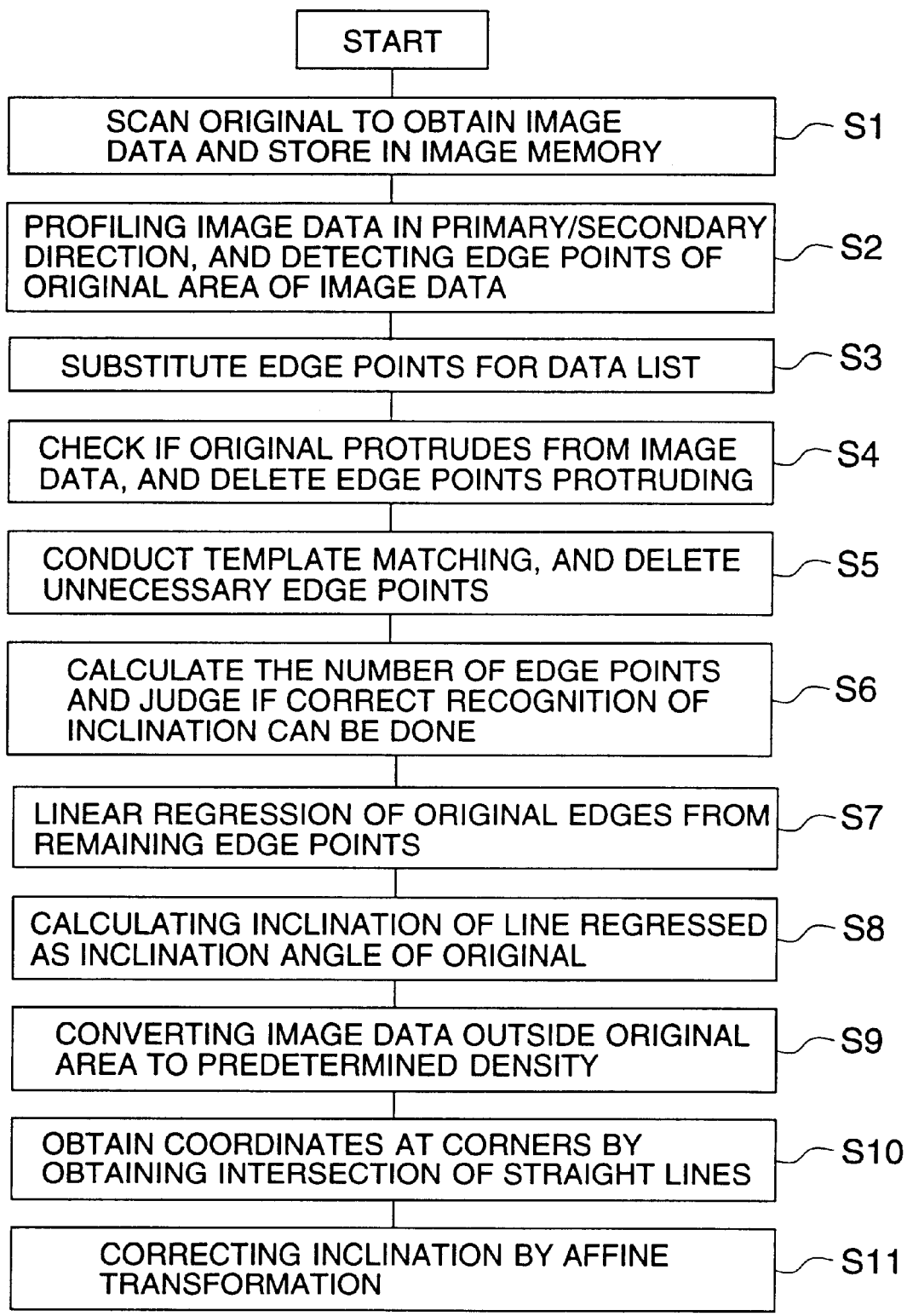
FIG. 3 is a flow chart showing processing steps for correction of inclination.

Next, before specifically describing inclination correction in the image reading apparatus 1 of the present embodiment, especially inclination detection, an outline of processing steps is described with reference to FIG. 3.

First, an original document on the document platen 11 is scanned employing an image scanning means to read the image in the reading area including an original document area and image data are obtained. The resulting image data are stored in the image memory 31 (S1). With the image data obtained by the aforesaid image reading means, profiles are obtained in the primary scanning direction (occasionally referred to as lateral direction) and in the secondary scanning direction (occasionally referred to as longitudinal direction), and each profile is subjected to tracing to detect a plurality of edges (occasionally referred to as edge points) in the original document area within the image data (S2).

Next, for every trace direction of the longitudinal direction and the lateral direction, edge points are arranged to prepare data lists (S3). The original document is then inspected on whether it is beyond the image data (reading area) or not. The edge points beyond the image data are deleted (invalidated) so that they are not used in the following processing (S4).

Next, with the use of each data list prepared in S3, edge points are subjected to mutual calculation and at the same time, are subjected to template matching to delete unnecessary edge points (S5). In this case, edge points arranged to form an angle exceeding 45° against the circumference of the reading area (against the lateral direction or longitudinal direction) and edge points located in a peculiar position (edge points which do not capture the edge of the original document and edge points which are located so as to put the corner of the original document between, etc.) are deleted so that they are not employed in the following processing.

After deleting unnecessary edge points in S4 and S5, the number of edge points which are not deleted (which remain) are calculated for each data list, and discrimination is carried out on whether there is the number of edge points enable of recognizing the correct inclination or not (S6). The edge points which are not deleted are then subjected to linear regression for each data list and the straight line expressing the edge of an original document is obtained upon calculation (S7). The angle of the inclined straight line obtained through the linear regression is then calculated as the inclination of the original document (inclined angle) (S8). In this case, detection accuracy can be evaluated by comparing the inclined angles of the straight lines of the data lists with each other.

Following that, the image data out of the original document area within the image data (reading area) are converted into desired density (preferably white) (S9). On the other hand, employing the straight line of each data list obtained in S7, the intersection of each straight line is obtained, which is recognized as the angle of an original document (S10).

On the basis of the original document inclination obtained as described above, and further, the image data stored in the image memory 31 (at least, image data in the original document area) based on the corner of the original document, are subjected to affine transformation (for example, the aforesaid Japanese Patent Publication Open to Public Inspection No. 7-262312, etc.) and data shift process (for example, refer to Japanese Patent Publication Open to Public Inspection No. 10-285379 and Japanese Patent Application No. 10-336425 applied by the inventors of the present invention) to correct the inclination (S11).

Each step will now be described in detail.

(S1)

This S1 is similar to conventional ones (known in the art) and no detailed explanation will be given. Further, in the present embodiment, the conveyance belt 27 (cover of the document platen) exhibits optical features different from white, and the aforesaid conveyance belt 27 is constituted in such a manner that it covers the document platen 11 via the original document placed on the document platen 11. This is due to the fact that because the base of the document platen is generally white, edge points in the original document area in S2 can readily and surely be detected by providing the conveyance belt 27 with the optical features different from white. The conveyance belt 27 exhibiting optical features different from white as described herein is one in which the surface, which covers the document platen 11, is a dense color (black), being different from white. Furthermore, besides providing tints, one exhibiting large amount of mirror surface reflected component, such as an aluminum plate, or a sheet which reflects light in the incident direction, etc. may be adhered onto the conveyance belt 27.

(S2)

Figure 4:
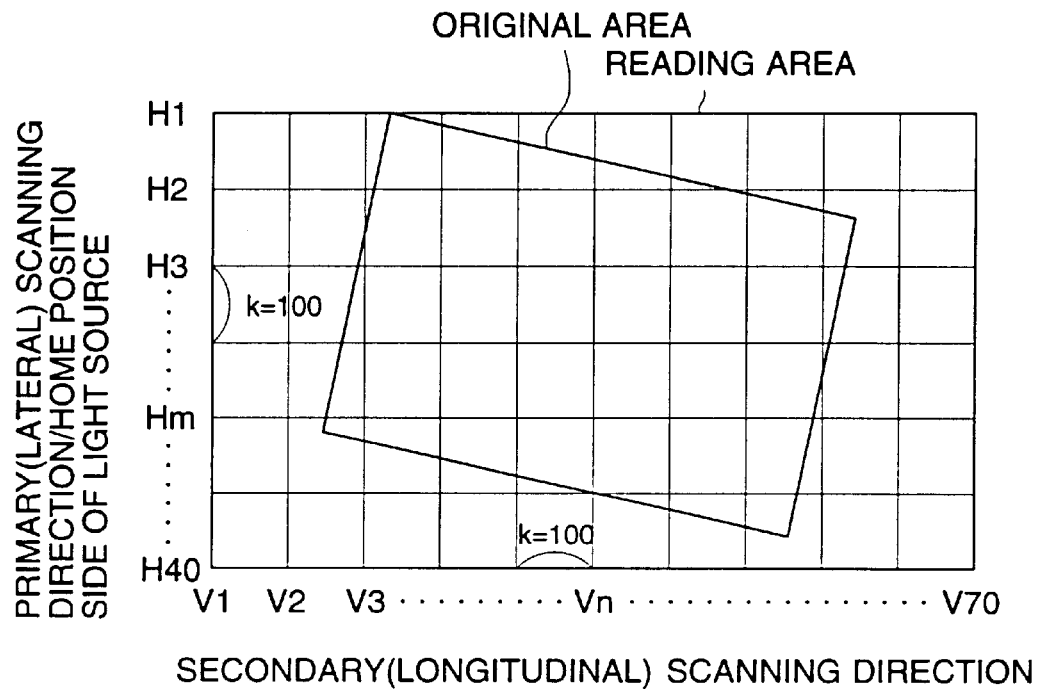
FIG. 4 is a schematic chart showing image data obtained by reading the image on an inclined original document.

The image data read in S1 are those of a larger reading area including the original document area on the document platen 11 in order to make it possible to correspond to original documents of various sizes. This reading area is generally equivalent to the maximum size which can be read by the image reading apparatus 1 and covers almost the entire surface of the document platen 11. The following explanation is based on the image data obtained by reading the image of the inclined original document which is schematically illustrated in FIG. 4. Further, the read image data, as shown in FIG. 4, include a large amount of data of the area beyond the original document area. Furthermore, the home position edge of the light source in FIG. 4 implies the reading top side, namely, the left side in FIG. 1(a).

In S2, when edge points are obtained, for the image data in the reading area, in the longitudinal direction, at every k line (pixel), imaginary lateral lines V1, V2, V3, . . . , Vn are drawn and in the lateral line, at every k column (pixel), imaginary lateral lines H1, H2, H3, . . . , Hn are drawn. Along these, profiles of image data PV1, PV2, PV3, . . . , PVn, and PH1, PH2, PH3, . . . , PHn are obtained. Namely, each of the profiles in the lateral direction and the longitudinal direction is obtained employing the image data.

Further, in the present embodiment, the reading area of the image reading apparatus 1 is A3 size at 400 dpi and the image data are composed of 4676×6912 pixels. Because "k" employed in the case of preparing the profile is assumed to be k=100, in the aforesaid Vn and PVn, n=70 and in the aforesaid Hn and PHn, m=40 is assumed. However, the present invention is not limited to these.

Figure 5:
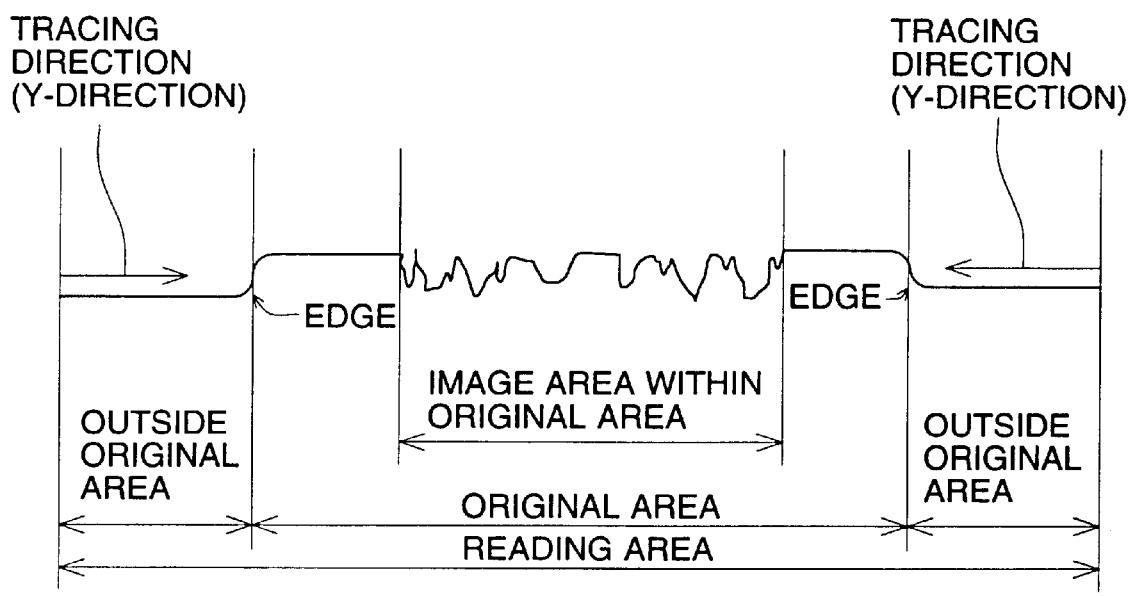
FIG. 5 is a chart showing one example of a profile.

Each of profiles PV1 through PV70 and PH1 through PH40 is one, for example, as shown in FIG. 5. In FIG. 5, in the image area within the original document area, because signals (luminance values shown in the longitudinal direction in FIG. 5) rise and fall, no specific trend appears in the profile. On the other hand, in the area beyond the original document area, due to the difference between the original document background and the conveyance belt 27 (particularly, as described above, the most backgrounds of original documents are white; when the conveyance belt 27 of the present embodiment is colored black, the difference becomes marked), signal rise (or fall) appears in the boundary portion.

Accordingly, in the present embodiment, each of these profiles is traced toward the center direction from both edges (in FIG. 4, right and left or top and bottom) in FIG. 5 and the first rise is detected. The first rise is recognized as the edge of the original document, that is, the edge (edge point) of the original document area and the position information is stored. Further, two edge points are obtained for each profile. Thus, in the present embodiment, a total of (40+70)×2=220 edge points can be obtained.

Judgment whether the obtained edge point is valid or not, that is, the detection of the rise is carried out in such a manner that if the following formulas in the lateral direction and the longitudinal direction are satisfied, the obtained edge is judged valid.

Lateral direction: $|PHm(y-a)-PHm(y+a)|>gap$

Longitudinal direction: $|PVn(y-a)-PVn(y+a)|>gap$

These formulas are used to judge whether, in the profile of PHm or PVn, the y point and the coordinate value in the tracing direction (the number of pixels (=distance) from the tracing commencement edge), is an edge point or not, and "a" and gap are integer parameters, for example, a=4, gap=40, respectively. Namely, in these formulas, by placing pixel PHm(y), or PVn(y), which is a subject for judgment to be an edge, in the center, when luminance difference between two pixels PHm(y−a) and PHm(y+a) or PVn(y−a) and PVn(y+a) which are separated by a predetermined distance (±a) is the same as the predetermined luminance, the pixel PHm(y) or PVn(y) to be a subject is judged an edge point (detection of the edge point).

Such edge point detection is carried out for each profile in the longitudinal direction and in the lateral direction from both ends, that is, the edge point is detected for each of four tracing directions of right, left, top, and bottom in FIG. 4 and the coordinate value y of the edge point is obtained.

Figure 6:
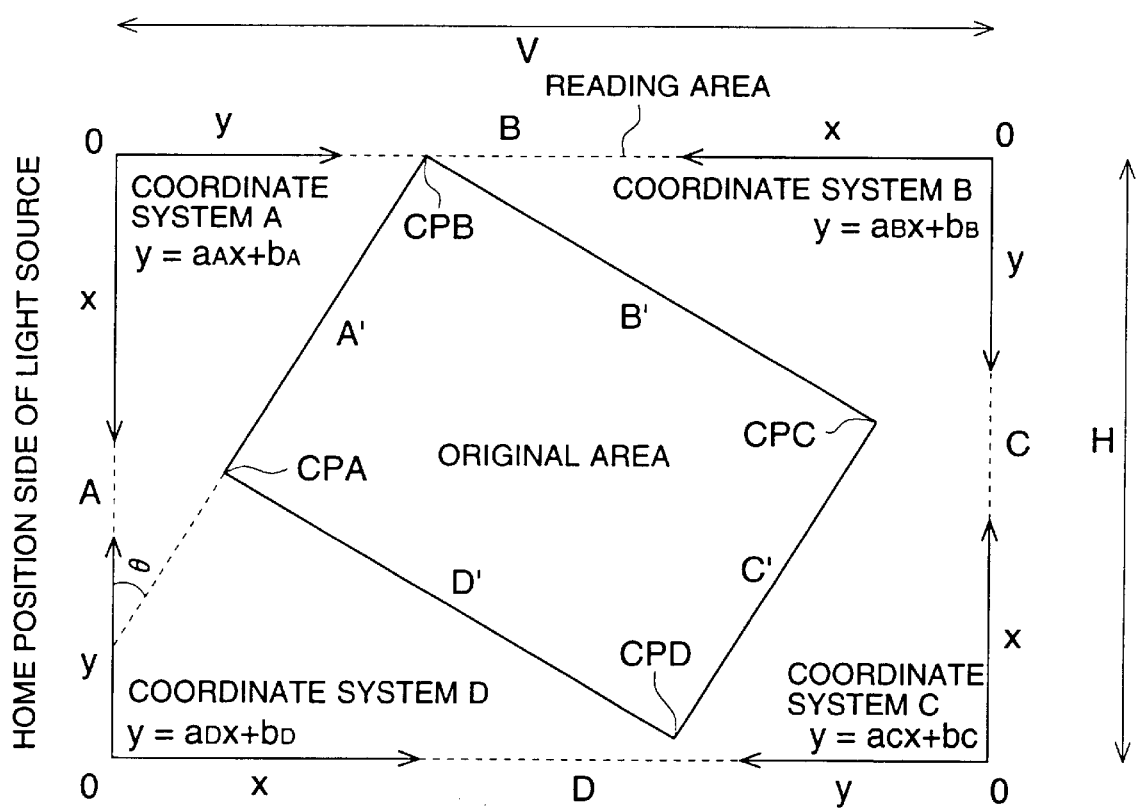
FIG. 6 is a chart which shows a coordinate system employed for detection of inclination in the reading area.

Regarding a coordinate system to simplify the following processing, description will herein be made with reference to FIG. 6 which illustrates the coordinate system employed to detect inclination in the reading area.

The reading area has length H in the lateral direction (primary scanning direction) and length V in the longitudinal direction (secondary scanning direction), and is a rectangle composed of sides A through D, as shown in FIG. 6. In such a reading area, with coordinate system A through coordinate system D, the corner of each reading area is positioned at the origin and sides (any of A through D) of the reading area coincide with the x axis and the y axis which are orthogonal to each other so that the tracing direction is the same as the y direction. In such a way, by always coinciding the tracing direction with the y direction, the same processing (processing to detect the inclination) can be carried out for data in any direction to achieve simplification. Accordingly, from the profiles PV1 through PV70 in the longitudinal direction, edge points of coordinate system B and coordinate system D can be obtained, while from profiles PH1 through PH40 in the lateral direction, edge points of coordinate system A and coordinate system C can be obtained.

Further, the reading area is a rectangle composed of each side of A' through D' and each corner is represented by CPA through CPD.

With the use of such coordinate systems A through D, the corner of the reading area is taken as origin 0, and the profile PVn (or PHm) along the trace line of the n-th (or m-th) is traced from the end (any side of A through D) of the reading in the y direction to enable obtaining edge point coordinates $(x_n, y_n)$ (or $(x_m, y_m)$) for each of the four tracing directions. (S3)

With the use of the edge point coordinate obtained in S2, for each of the four tracing directions, data lists are matched with coordinate systems A through D, and four of Data List A(i, j), Data List B(i, j), Data List C(i, j), and Data List D(i, j) are prepared; wherein i represents a serial number assigned to the edge point and in the coordinate systems A and C, m is 1 to 40; in the coordinate systems B and D, n is 1 to 70; and furthermore, j specifies the data member show in Table 1.

TABLE 1

| Value of j | Symbol | Meaning | Size |
|---|---|---|---|
| 0 | x | x coordinate | 2 byte integer |
| 1 | y | y coordinate | 2 byte integer |
| 2 | s | Discriminant Value (difference of adjacent y) | 2 byte integer |
| 3 | sd | Discriminant Value (= s/k) | 1 byte integer |
| 4 | f1 | Discriminant Result (for 45° judgment) | 1 bit |
| 5 | f2 | Discriminant Result (for discrimination of peculiar point of corner) | 1 bit |
| 6 | ssd | Discriminant Value (difference of neighboring s) | 1 byte integer |
| 7 | f3 | Discriminant Result (for discrimination of improvement in accuracy) | 1 bit |
| 8 | fs | Delete Flag | 1 bit (0: remain, 1: delete) |

Accordingly, for example, the edge point coordinates $(x_n, y_n)$ in the coordinate system A are that to Data List A(n, j), for J=0, $x_n$ is put and for j=1, $y_n$ is put. Further, the other data member (j=2 to 8) is described with reference to examples below. Therefore, no examplanation is given here.

Data List A(i, j) through Data List D(i, j) do not correspond to inclined original document area sides A' through D' to a first implication. Example, as shown in FIG. 6, sides A' and D' correspond to Data List A(i, j), that is, the edge point along the side A' and the edge point along the side D' are contained. Other three data lists are the same as described above. Accordingly, in the following processing, upon letting one side correspond to each of Data List A(i, j) through Data List D(i, j) of each of coordinate systems A through D, from Data List A(i, j) through Data List D(i, j), one equation of each side of A' through D' of each reading area is obtained. From these formulas, the intersection of each side of A' through D', that is, the coordinates of original document area's corners CPA through CPD, and original document inclination are obtained.

The edge point obtained in S2 as decribed above not always captures the edge of the original document area. This is due to the fact that, for example, on account of various factors such that a part of the original document is placed beyond the document platen 11 (placed out of the reading area), the document platen is stained, and the like, a part other than the edge of the original document area is mistakenly detected as the edge point. The subsequent S4 and S5 are processes in which the edge point having the possibility of erroneous detection due to such various factors is detected and regarding the aforesaid edge point, the delete flag fs shown in Table 1 is raised (let it be 1) to find the valid edge point. Further, in the present embodiment, the selection of valid edge points from the invalid edge points are also employed to let one side correspond to each of Data List A(i, j) through Data List D(i, j) of each coordinate system A through D.

(S4)

There are cases in which one part of the original document is placed beyond the document platen due to the inclination of an original document or one part of the original document is beyond the document platen due to reading the image of the original document larger than the document platen. In this case, the image data of the entire area of the original document is not read within the reading area. At the time, the edge of the original document placed beyond the document platen 11, irrespective of the fact that it is not present in the reading area, is occasionally detected as the edge point in the aforesaid S2 due to variation in luminance values in the image area within the original document area. Due to that, when the edge point is obtained in S2 for the portion in which the original document is not correctly placed, the edge point of data list is invalidated (that is, the delete flag fs is raised) so that it is not employed in the process following S7.

Specifically, in the neighborhood (the neighborhood of y=0 in the coordinate systems A through D) of the extremes of the profile, with some successive pixels (for example, about 1 to 10 pixels), an average of luminance is obtained. When the obtained average exceeds the predetermined luminance value, the edge points obtained in S2 from the profile in the coordinate system are judged not to capture the edge of the original document so as to raise the delete flag fs for the edge point.

(S5)

In S5, with the use of each data list prepared in S3, calculation among mutual edge points are carried out while performing template matching and unnecessary edge points are deleted (delete flag fs is raised).

First, a process to let one side correspond to each Data List A(i, j) through Data List D(i, j) of each of the coordinate systems A through D. Namely, as described above, for example, in Data List A(i, j), as shown in FIG. 6, the edge points along side A' and along side D' are incorporated. Accordingly, in the present embodiment, one of the edge points which is along two sides is picked up in the one data list. Namely the edge point which is along the other side is deleted. In this case, in order to remain more edge points (to decrease the deleted points), it is preferred to delete (to raise the delete flag fs) edge points which are arranged with an inclination of 45° or more to the neighborhood of the reading area (against the longitudinal direction or lateral direction). In other words, the edge points remain which are arranged with an inclination of not more than 45° and the remaining edge points are employed in the process (calculation of original document inclination, etc.) subsequent to S7 to enable improvement in the detection accuracy of the inclination.

Figure 7:
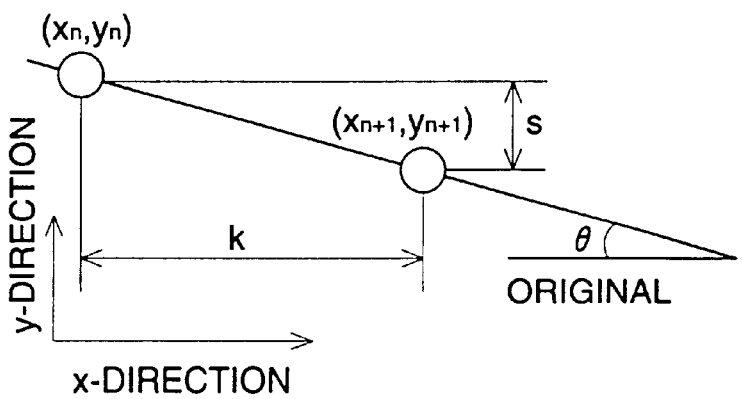
FIG. 7 is a schematic view showing edge points adjacent to each other.

Specifically, a process as described below is carried out. Adjacent edge points, $(x_n, y_n)$ and $(x_{n+1}, y_{n+1})$ as shown in FIG. 7, are herein considered. Distance difference "s" in the y axis direction of the adjacent edge points is obtained employing $y_n$ and $y_{+1}$ being incorporated in the data list. Namely, calculation can be made employing $s=|y_n-y_{n-1}|$ and the calculated result is placed in j=2 of each data list as discriminant value "s". Furthermore, distance difference "k" in the x direction of adjacent edge points can be calculated in the same manner, employing $k=|x_n-x_{n-1}|$. However, in the present embodiment, because "k" is a definite value (=100) employed in S2, this value is employed.

If difference "k" in the x axis direction and difference in the y axis direction of two adjacent edge points are found, according to tanθ=s/k, inclination angle θ of the adjacent edge points is found. This tanθ is employed as discriminant value "sd", which is put in j=3 in each data list.

Further, regarding an edge point for which the delete flag fs is raised, the edge point is removed and tanθ may be obtained employing each difference in the x direction and the y direction of adjacent edge points.

Then, if this discriminant value "sd" is found to be more than or less than threshold value t1, then the discriminant result is represented by f1. Namely, the following is obtained.

$$sd<t1 \rightarrow f1=0$$

$$sd \geq t1 \rightarrow f1=1$$

In the present embodiment, in order to discriminate whether the inclination of adjacent edge points is more than 45° or not more than 45°, t1=1 is employed.

Figure 8:
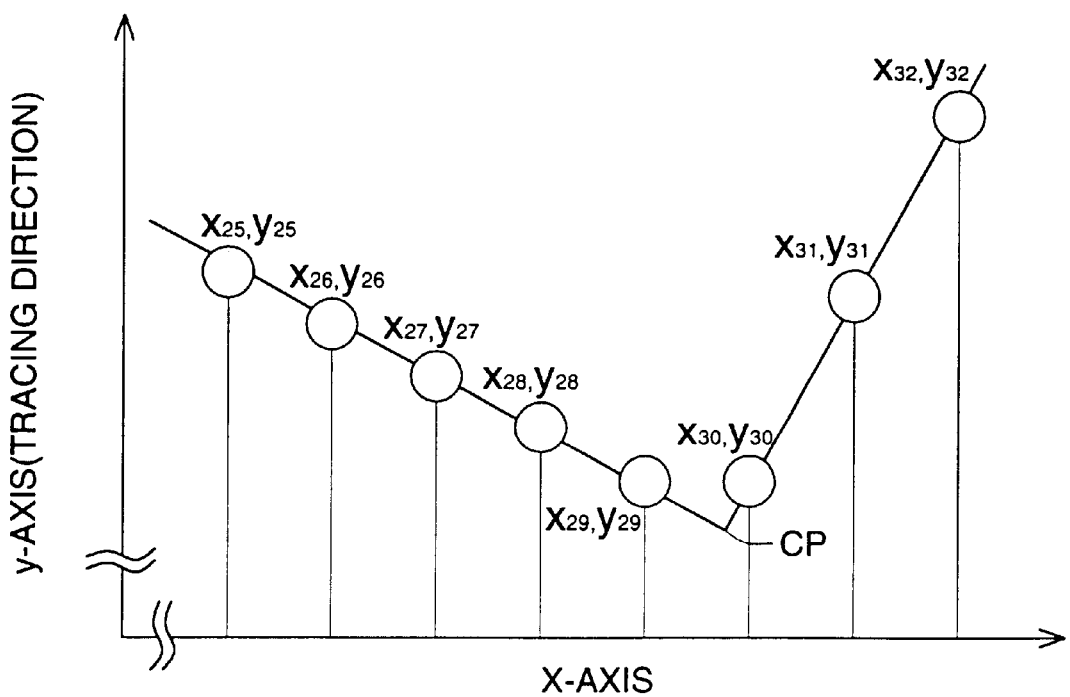
FIG. 8 is a schematic view showing an edge point adjacent to a corner of the original document area.

As one example, explanation is herein made for the case in which x coordinate values and y coordinate values as shown in Table 2 are obtained for each of the edge points in the neighborhood of the corner CP in the original document area as shown in FIG. 8. In such a way, when the y coordinate of an edge point is known, difference "s" between adjacent edge points in the y axis direction can be calculated and values shown in Table 2 are obtained. Furthermore, because difference "k" between adjacent edge points in the x axis direction is 100, discriminant value "sd" can be calculated as $sd=|\tan \theta|=|s/k|$, and values as shown in Table 2 are obtained. With the use of threshold value t1 (=1), discrimination is made whether the inclination of the adjacent edge point is more than 45° or not more than 45°, and 0 or 1 is used in the discriminant result f1.

With the use of this discriminant result f1, the delete flag fs may be raised at the edge point of f1=1. However, in the present embodiment, among edge points along two sides, the edge point along one side is deleted in one data list, that is, macroscopically, for the arrangement of this discriminant result f1, with the use of one dimensional template, deletion (delete flag fs is raised) is carried out for the edge point matched with template matching, and as a result, the improvement in accuracy is achieved (in other words, excessive deletion is prevented).

In the present embodiment, this template uses "11" as shown in Table 2, and tracing may be carried out while superimposing this template on the discriminant result f1. The delete flag fs is raised (in Table 2, i=31 to) for the edge point which is matched.

corner of an original document (for example, edge points $(x_{29}, y_{29})$ and $x_{30}, y_{30}$) in FIG. 8) or the edge point is beyond the sides of an original document. When the template "00001" is matched, the delete flag fs is raised at two edge points of the right end, and when the template "10000" is matched, the delete flag fs is raised at two edge points of the left end.

TABLE 2

| i | ... | 24 | 25 | 26 | 27 | 28 | 29 | 30 | 31 | 32 | 33 | ... |
|---|---|---|---|---|---|---|---|---|---|---|---|---|
| x Coordinate | ... | 2400 | 2500 | 2600 | 2700 | 2800 | 2900 | 3000 | 3100 | 3200 | 3300 | ... |
| y Coordinate | ... | 1520 | 1470 | 1430 | 1360 | 1320 | 1260 | 1250 | 1500 | 1760 | 2010 | ... |
| Discriminant Value s | ... | 50 | 40 | 70 | 40 | 60 | 10 | 250 | 260 | 250 | . | ... |
| Discriminant Value sd | ... | 0.5 | 0.4 | 0.7 | 0.4 | 0.6 | 0.1 | 2.5 | 2.6 | 2.5 | . | ... |
| Discriminant Result fl | ... | 0 | 0 | 0 | 0 | 0 | 0 | 1 | 1 | 1 | . | ... |
| Template | ... | ---- | ---- | ---- | ---- | ---- | ---→ | 1 | 1 | ---- | ---→ | ... |
| Delete flag fs | ... | 0 | 0 | 0 | 0 | 0 | 0 | 0 | 1 | 1 | . | ... |

As described above, when at least 45° inclination of adjacent edge points is continuously generated (that is, when in the successive three edge points, between each of them, the angle is at least 45°), raising the delete flag fs, includes, as described above, not only the function in which the edge point along one side remains, but also the function in which when the edge point located at the center of three edge points along the sides to remain, is in a peculiar position, the edge point in this peculiar position (edge point which does not capture the edge of an original document) can be deleted.

When utilizing this template matching, edge points in various peculiar positions can be deleted, which will be described below.

First, by employing "00001" or "10000", as the template, it is possible to detect the case when edge points cross the This example is shown in Table 3 (the case in which an x coordinate value and a y coordinate value are obtained in the same manner as in Table 2 for each of the edge points near corner CP of an original document area). In this case, in the same manner as described above, a discriminant value "s" is obtained, which is the difference between adjacent edge points in the y direction. Employing threshold value t2 (in the example of Table 3, t2=100), if the discriminant value "s" is more than t2, 1 is used in discriminant result f2, and if it is less than t2, 0 is used in the discriminant result f2.

When employing one dimensional template (in the example of Table 3, "00001") for the arrangement of this discriminant result f2, matching carried out employing the template, the delete flag fs is raised for two edge points $(x_{29}, y_{29})$ and $(x_{30}, y_{30})$ of the right end.

TABLE 3

| i | ... | 24 | 25 | 26 | 27 | 28 | 29 | 30 | 31 | 32 | 33 | ... |
|---|---|---|---|---|---|---|---|---|---|---|---|---|
| x Coordinate | ... | 2400 | 2500 | 2600 | 2700 | 2800 | 2900 | 3000 | 3100 | 3200 | 3300 | ... |
| y Coordinate | ... | 1520 | 1470 | 1430 | 1360 | 1320 | 1260 | 1250 | 1500 | 1760 | 2010 | ... |
| Discriminant Value s | ... | 50 | 40 | 70 | 40 | 60 | 10 | 250 | 260 | 250 | . | ... |
| Discriminant Result f2 | ... | 0 | 0 | 0 | 0 | 0 | 0 | 1 | 1 | 1 | . | ... |
| Template | ... | ---→ | 0 | 0 | 0 | 0 | 0 | 1 | ---- | ---- | ---→ | ... |
| Delete flag fs | ... | 0 | 0 | 0 | 0 | 0 | 1 | 1 | 1 | 1 | . | ... |

As described above, in the example in Table 3, a case, in which the edge points $(x_{29}, y_{29})$ and $(x_{30}, y_{30})$, that is, two edge points cross over the corner CP of an original document, is detected and these can be deleted.

The edge points which remain (no delete flag is raised) after the template matching as mentioned above, are ideally supposed to be on a straight line (one side). However, in practice, there are edge points (peculiar edge points) which do not capture the edge (side) of the original document due to various factors. Subsequently, in order to delete the peculiar edge points, in the present embodiment, for 5 edge points, edge points other than the edge points in the center are on the same one side and when the center edge point is only out of the side, this template matching is employed to remove this edge point in the center.

Specifically, when edge points are placed on a straight line (side), the discriminant value becomes almost constant (because difference "k" is constant in the x axis direction). Furthermore, difference between adjacent discriminant values "sd" is obtained as discriminant value "ssd". By doing so, in the edge points along the side of an original document, this discriminant value "ssd" shows a value near 0. However, any edge points which are away from the side, show a value corresponding to the degree they are away from the side. With the use of this, template matching is carried out to delete the edge points which are not on the side.

Figure 9:
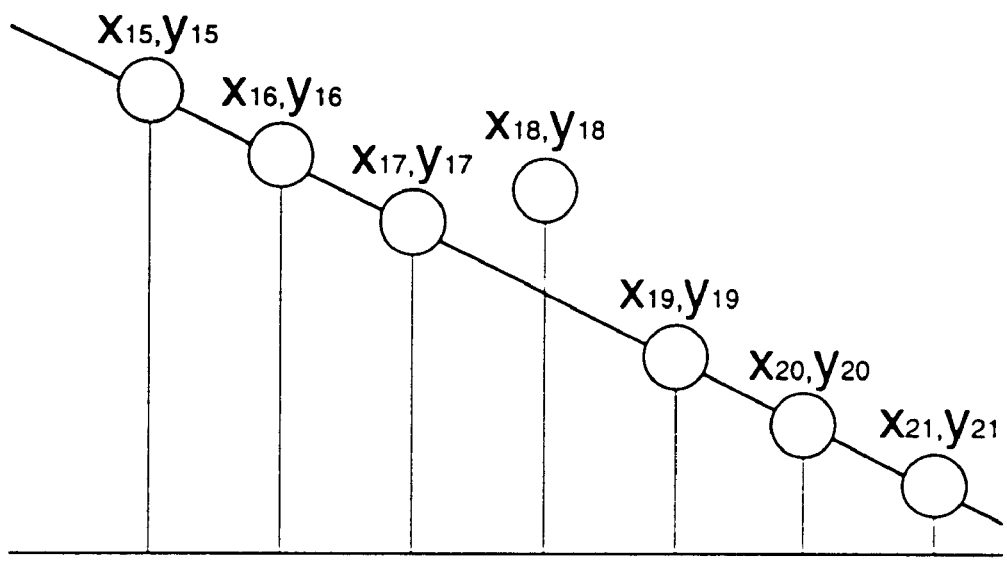
FIG. 9 is a schematic view showing an edge point on one side of an original document area.

As one example of this case, description is made for a case in which with edge points $(x_{15}, y_{15})$ through $(x_{21}, y_{21})$ on one side of an original document area as shown in FIG. 9, x coordinate values and y coordinate values, as shown in Table 4, are obtained. In the same manner as described above, discriminant value "s" is calculated, which is the difference between edge points in the y axis direction and further, any difference between adjacent discriminant values "sd" is calculated as discriminant value "ssd". With the use of threshold value t3 (=10), if the discriminant value "ssd" is more than threshold t3, 1 is used in discriminant result f3 and if it is below t3, 0 is used in the discriminant value f3.

For the arrangement of discriminant result f3, with the use of one dimensional template (in the example in Table 3, "1u1", wherein u represents numeral implying indefinite, that is, it may be 1 or 0), when a matching process is carried out employing template matching, delete flag fs is raised for a center edge point $(x_{18}, y_{18})$.

As described above, in S5 of the present embodiment, with the use of each data list prepared in S3, the calculation for mutual edge points is carried out, and at the same time, template matching is carried out to delete unnecessary edge points, that is, to raise delete flag fs so that edge points arranged in a line having a inclination of at least 45° for the circumference of the reading area (for either the longitudinal direction or the lateral direction), or edge points in a peculiar position (being edge points which do not capture the edge of an original document or which cross over the corner of the original document) are not employed as unnecessary edge points in the following process. Further, S4 and S5 are carried out for each of Data List A(i, j) through Data List D(i, J).

(S6)

In the above described S4 and S5, edge points for which no delete flag has been raised are counted for each of Data List A(i, j) through Data List D(i, j) (for each tracing direction), and when the counted value is below the predetermined value (for example, 5 points), the subsequent processing based on the data lists is terminated because the accuracy for the inclination detection is not obtained due to the small number of samples.

(S7)

In S7, edge points which have not been deleted are subjected to linear regression for each data list to obtain a straight line representing the edge of an original document through calculation (S7). Namely, from any x coordinates and any y coordinates of the edge point for which no delete flag has been raised, a straight line is approximated (linear regression). As the approximation method, various approximation methods, for example, least-squares approximation, etc. may be employed. Furthermore, the linear regression is carried out for each Data List A(i, j) through Data List D(i, j) (in each of the tracing direction).

The straight lines obtained by the aforesaid linear regression, as shown in FIG. 6, can be expressed by $y=a_Ax+b_A$, $y=a_Bx+b_B$, $y=a_Cx+b_C$, and $y=a_Dx+b_D$, corresponding to each of sides A' through D' of the original document area.

(S8)

In S8, from the straight line obtained (regressed) in S7, the inclination of the straight line is calculated as the original document inclination (inclination angle) θ. Namely, from

TABLE 4

| i | ... | 15 | 16 | 17 | 18 | 19 | 20 | 21 | ... |
|---|---|---|---|---|---|---|---|---|---|
| x Coordinate | ... | 1500 | 1600 | 1700 | 1800 | 1900 | 2000 | 2100 | ... |
| y Coordinate | ... | 2300 | 2280 | 2260 | 2340 | 2220 | 2200 | 2180 | ... |
| Discriminant Value s | ... | 20 | 20 | 80 | 120 | 20 | 10 | . | ... |
| Discriminant Value ssd | ... | 0 | 60 | 40 | 100 | 0 | . | . | ... |
| Discriminant Result f3 | ... | 0 | 1 | 1 | 1 | 0 | . | . | ... |
| Template | ... | ---▶ | 1 | u | 1 | ---- | ---▶ | 1 | ... |
| Delete flag fs | ... | 0 | 0 | 1 | 0 | 0 | . | . | ... | the aforesaid obtained straight line, the original document inclination θ can be obtained using the following formula.

θ=Tan$^{-1}$(a)

In this case, as coefficient "a", any of $a_A$, $a_B$, $a_C$, or $a_D$ of the straight line may be used. However, with the use of all four straight lines, each θ is obtained and by comparing these θ values, it is possible to find whether the regressed straight line correctly captures the edge of the original document or not, that is, it is possible to evaluate detection accuracy. Namely, if the four θs are almost equal, it is possible to judge that the regressed straight line correctly captures the edge of the original document.

(S9)

In the image reading apparatus which performs the correction of inclination, the area beyond the original document area in the reading area, for example, stain on the conveyance belt 27 (document platen cover) which covers the document platen 11 is read as "noise". Specifically, in the present embodiment, because the conveyance belt 27 is colored to density of color (black, etc.) different from white, the image data beyond the original document area is likely painted with the aforesaid color and the preferred image data cannot be obtained. Particularly, when image formation is carried out employing the image data read by the image reading apparatus 1, the consumption of colorant (for example, toner, etc.) in the image forming device is accelerated and the appearance of the formed images is unacceptable.

Due to that, in the present embodiment, during S9, the image data beyond the original document area in the image data (reading area) are converted to the specified density of color (being preferably white).

Specific explanations follow. First, on the basis of the four straight lines regressed in S7, the outside of the original document area is specified. Namely, the four straight lines regressed in S7 are represented by coordinate systems different from each other, and "y" always represents the distance from each of sides A through D of the image data (reading area) to the edge (each of sides A' through D' in the original document area) of the original document area. Therefore, it is judged that the area which satisfies the relationship of y<ax+b is beyond the original document area. Accordingly, by scanning all pixels (the entire reading area) of the image data stored in the image memory 31, when any one of four conditioning formulas based on the four straight lines regressed in S7, that is, y<$a_A$x 30 $b_A$, y<$a_B$x+$b_B$, y<$a_C$x+$b_C$, and y<$a_D$x+$b_D$ is satisfied, then that pixel is judged to be beyond the original document area.

For any pixel which is judged to be beyond the original document area, the data in the image memory 31 are converted to the predetermined density of color (being preferably white) and the density is subjected to conversion.

(S10)

Next, during S10, with the use of the four straight lines of each data list obtained in S7, the intersections of each straight lines are obtained. The resulting points are recognized as corners CPA through CPD of the original document. However, because the coordinate systems of the four straight lines are different with each other, as shown in FIG. 6, prior to obtaining these intersections, coordinate transformation is carried out so that they are in the same coordinate system. Herein, the coordinate transformation is carried out employing coordinate system A as the standard (so as to be transformed in coordinate system A). Further, dimensions of the reading area have length H in the lateral direction (being the primary scanning direction ) and length V in the longitudinal direction (being the secondary scanning direction).

Accordingly, the formula, y=$a_A$x+$b_A$, obtained using coordinate system A, is not changed, while the formula, y=$a_B$x+$b_B$, obtained using coordinate system B, is expressed by y=-x/$a_B$+$b_B$/$a_B$+V, the formula, y=$a_C$x+$b_C$, obtained using coordinate system C, is expressed by y=$a_C$x+V-$a_C$H-$b_C$, the formula, y=$a_D$X+$b_D$, obtained using coordinate system D, is expressed by y=-x/$a_D$+H/$a_D$-$b_D$/$a_D$.

On the basis of these four formulas which have been subjected to coordinate transformation, corners CPA through CPD of the original document can be obtained as the intersection of two straight lines which cross at the point. For example, when the inclination of the original document is less than 45°, from the formula obtained by coordinate system A and the formula which is subjected to the coordinate transformation employing the formula obtained by the coordinate system D, the coordinate ($x_{CPA}$, $y_{CPA}$) can be obtained employing:

$x_{CPA}$=(((H-$b_D$)/$a_D$)-$b_A$)/($a_A$+1/$a_D$)

$y_{CPA}$=(((H-$b_D$)/$a_D$)-$b_A$)/($a_A$+1/$a_D$)·$a_A$+$b_A$.

In the same manner, corners CPB, CPC, and CPD of the original document can be obtained as the intersections of two straight lines which cross each point.

(S11)

In S11, on the basis of the original document inclination obtained in S8, and further, of corners CPA through CPD of the original document obtained in S10, the inclination of the image data (at least, the image data in the original document area) stored in the image memory 31 is corrected. For this inclination correction, angle correction is carried out, which corresponds to the original document inclination θ obtained in S8, and parallel movement correction is also carried out, which corresponds to the original document inclination θ and CPA through CPD of the original document obtained in S10. These angle corrections and parallel movement corrections can be carried out employing the affine transformation and the data shift processing.

The affine transformation is a method to correct inclination directly employing a trigonometric function. For example, any datum (pixel) which is located at (x, y) is rotated clockwise. by inclination angle θ using center (p, q) and further, is moved parallelly by P in the x direction, and by Q in the y direction. Then, the position (X, Y) of the datum is expressed as:

X=(x-p)cos θ-(y-q)sin θ+P

Y=(x-p)sin θ+(y-q)cos θ+Q

Furthermore, the data shift process is a method to correct inclination with shifting pixel by pixel in the image memory 31. Specifically, the process is carried out, which is described in the aforesaid Japanese Patent Application Nos. 10-285379 and 10-336425 applied by the present applicants.

Further, when due to a small number of data, any of them is not obtained in S8 or S10, on the basis of obtained information, inclination correction may be appropriately carried out. For example, when the inclination angle θ of the original document is only obtained, only angle correction is carried out.

As detailed above, in order to detect inclination, the present invention can provide an image reading apparatus which simply detects inclination without requiring an exclusive sensor, additional mechanical motion nor complicated image recognition.

What is claimed is:

1. An image reading apparatus comprising:
   (a) image reading means for reading an image in a reading area including an inside and an outside of an original document area to obtain image data;
   (b) a memory for storing the image data obtained by the image reading means;
   (c) edge detecting means for detecting a plurality of edges in the original document area according to the image data obtained by the image reading means,
   wherein said detecting means detects a first difference in values on coordinates between two adjacent edges of the plurality of edges, determines an inclination of the two adjacent edges based on the first difference, judges whether the inclination has an inclination angle of less than 45°, and then selects edges having the inclination angle of less than 45° by applying a first template matching to the judgment result, and
   wherein said detecting means detects a second difference in values on coordinates between two adjacent first differences, determines a singular edge point which does not designate the edge of the original document by applying a second template matching different from the first template matching, and then eliminates the singular edge point from the selected edges having the inclination angle of less than 45°;
   (d) calculating means for calculating an inclination angle of an original document based on the selected edges; and
   (e) correcting means for correcting the inclination angle of the original document based on the inclination angle calculated by the calculating means with respect to at least the image data in the original document area among the image data stored in the memory.

2. The image reading apparatus of claim 1, further comprising:
   a document platen on which the original document is placed;
   a document platen cover having an optical characteristic different from white for covering the document platen;
   scanning means for optically scanning the reading area including the inside and outside of the original document area through the document platen; and
   an image sensor for conducting photoelectric conversion of light reflected from the reading area, to thereby read the image in said reading area and obtain the image data.

3. The image reading apparatus of claim 1, further comprising converting means for converting image data outside the original document area to have a predetermined density.

* * * * *